J. LEMIRE.
COMBINATION AND MANAGEMENT OF ELECTRIC CIRCUITS AND THEIR APPLICATION
TO RAILWAY SIGNALING SYSTEMS.
APPLICATION FILED OCT. 3, 1907.
907,614.
Patented Dec. 22, 1908
6 SHEETS—SHEET 6.
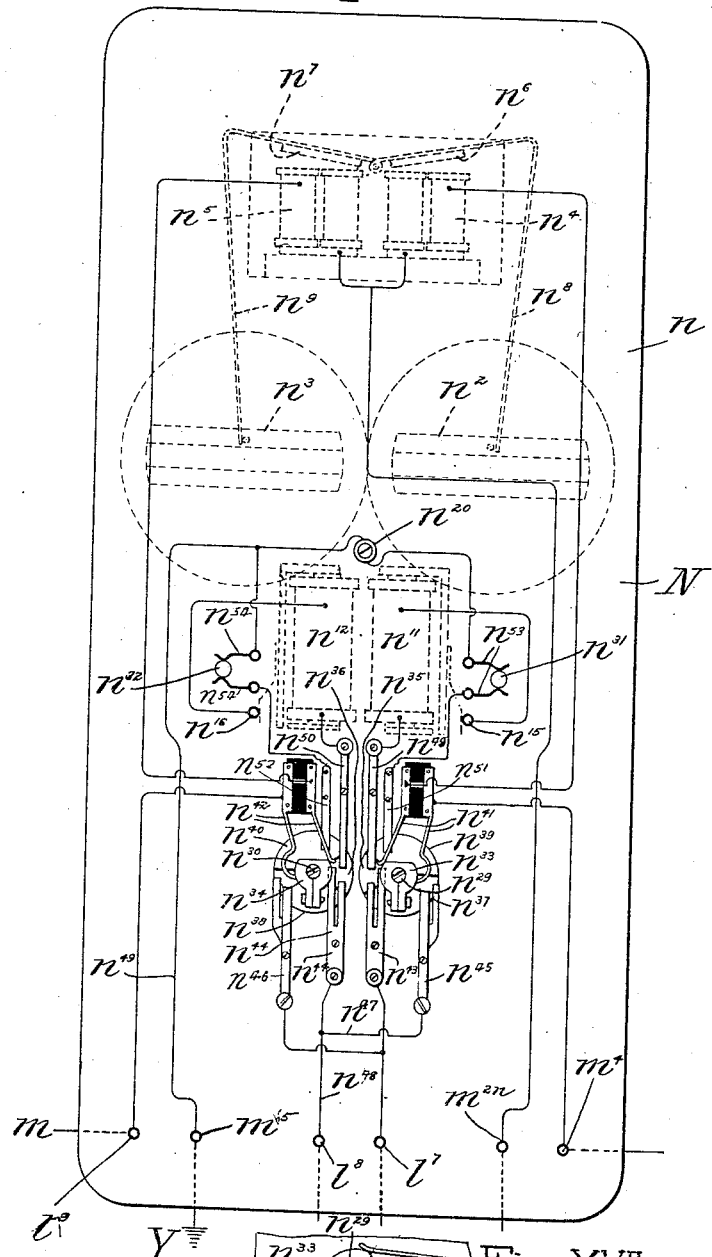
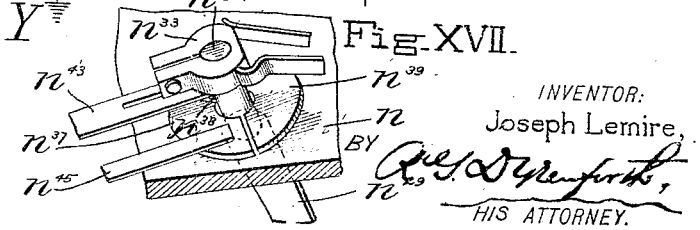
WITNESSES
INVENTOR:
Joseph Lemire,
BY
HIS ATTORNEY.

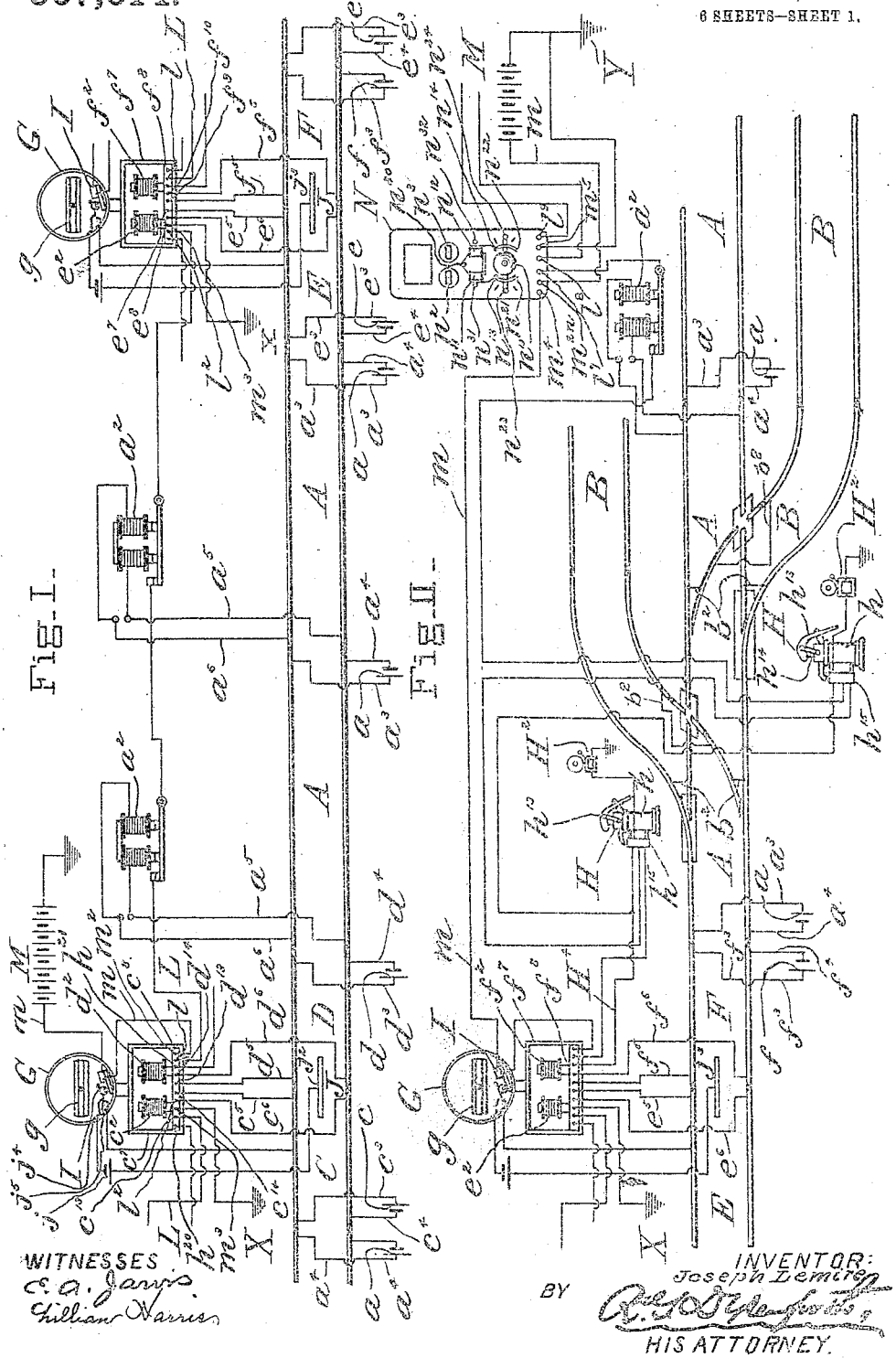

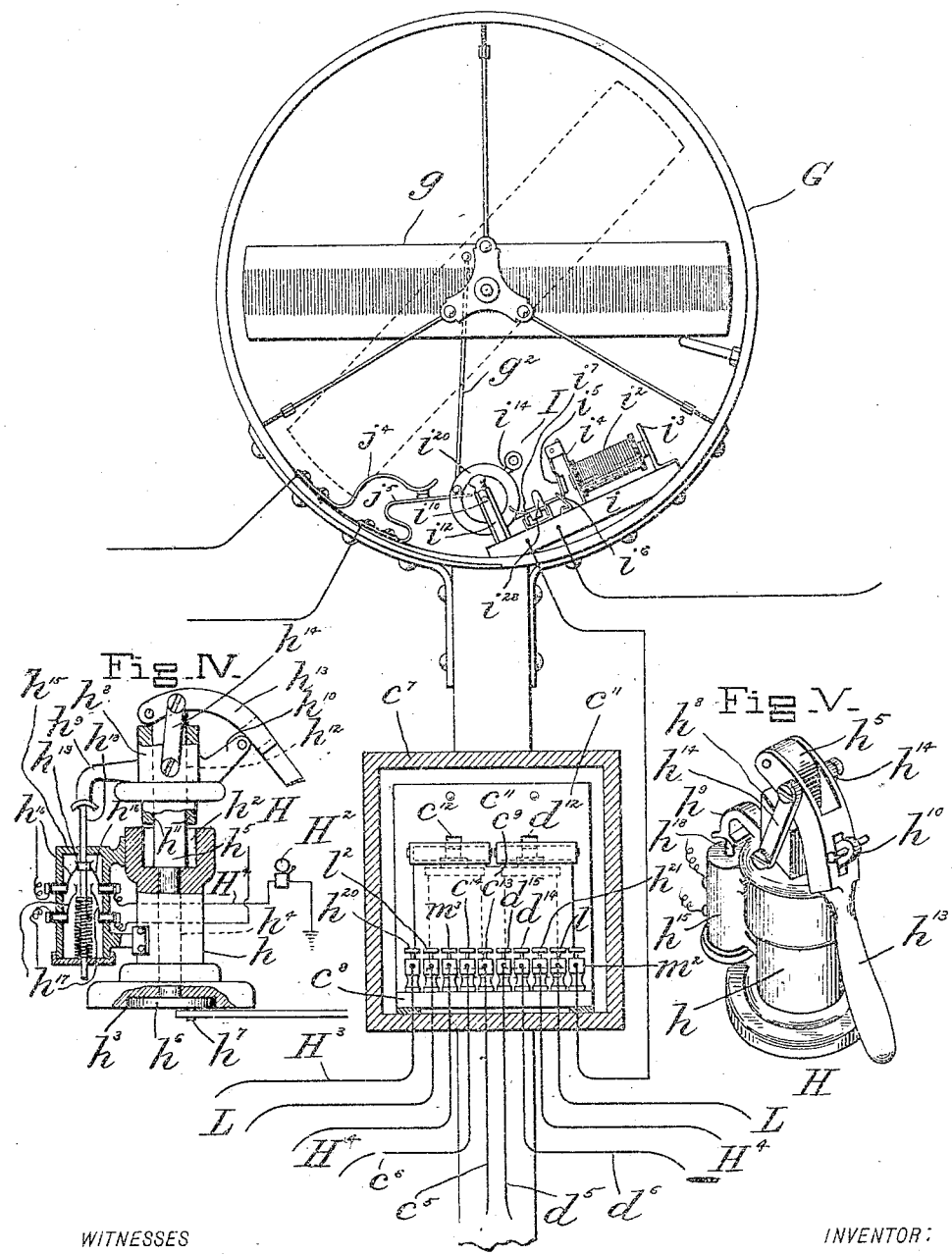

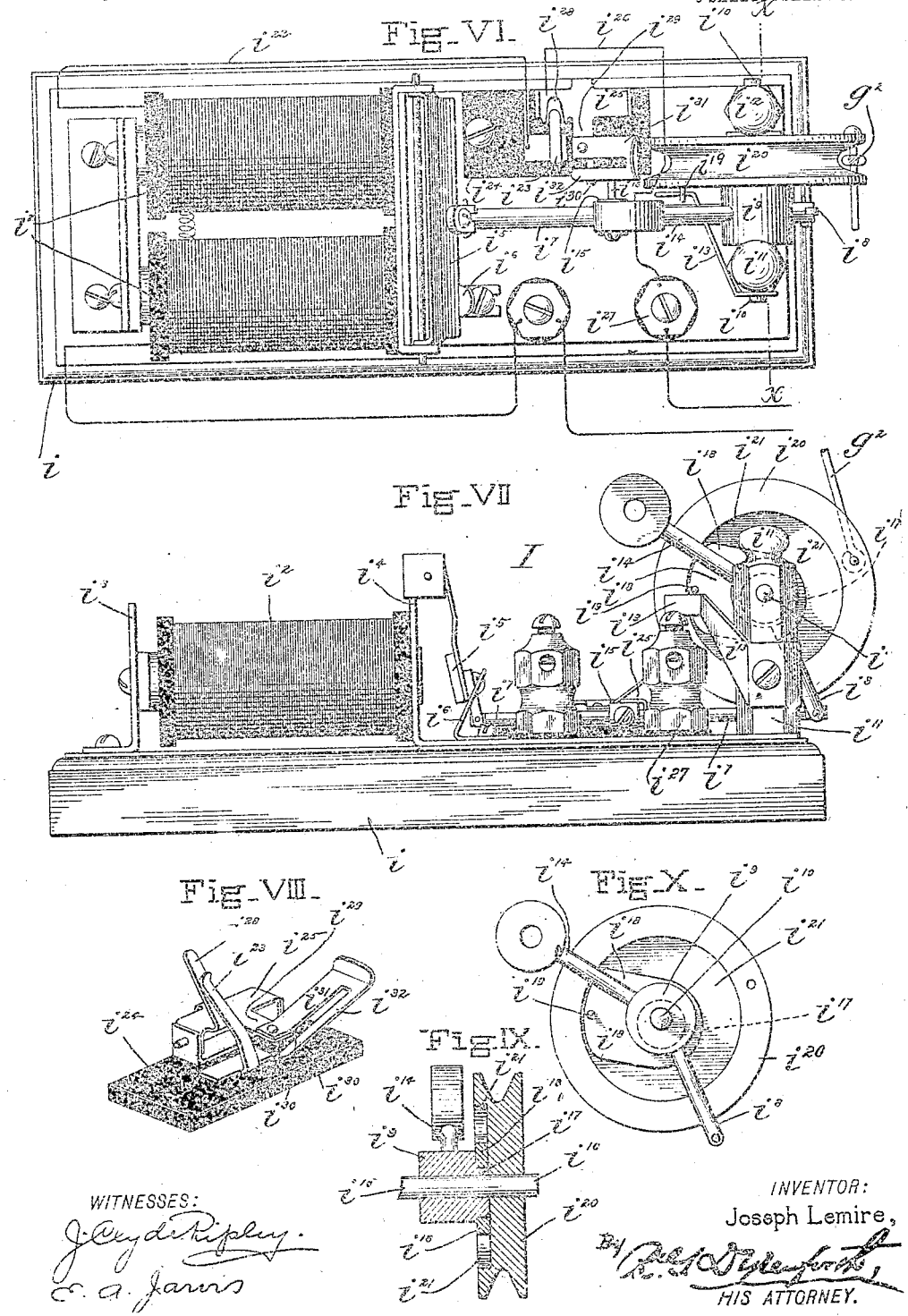

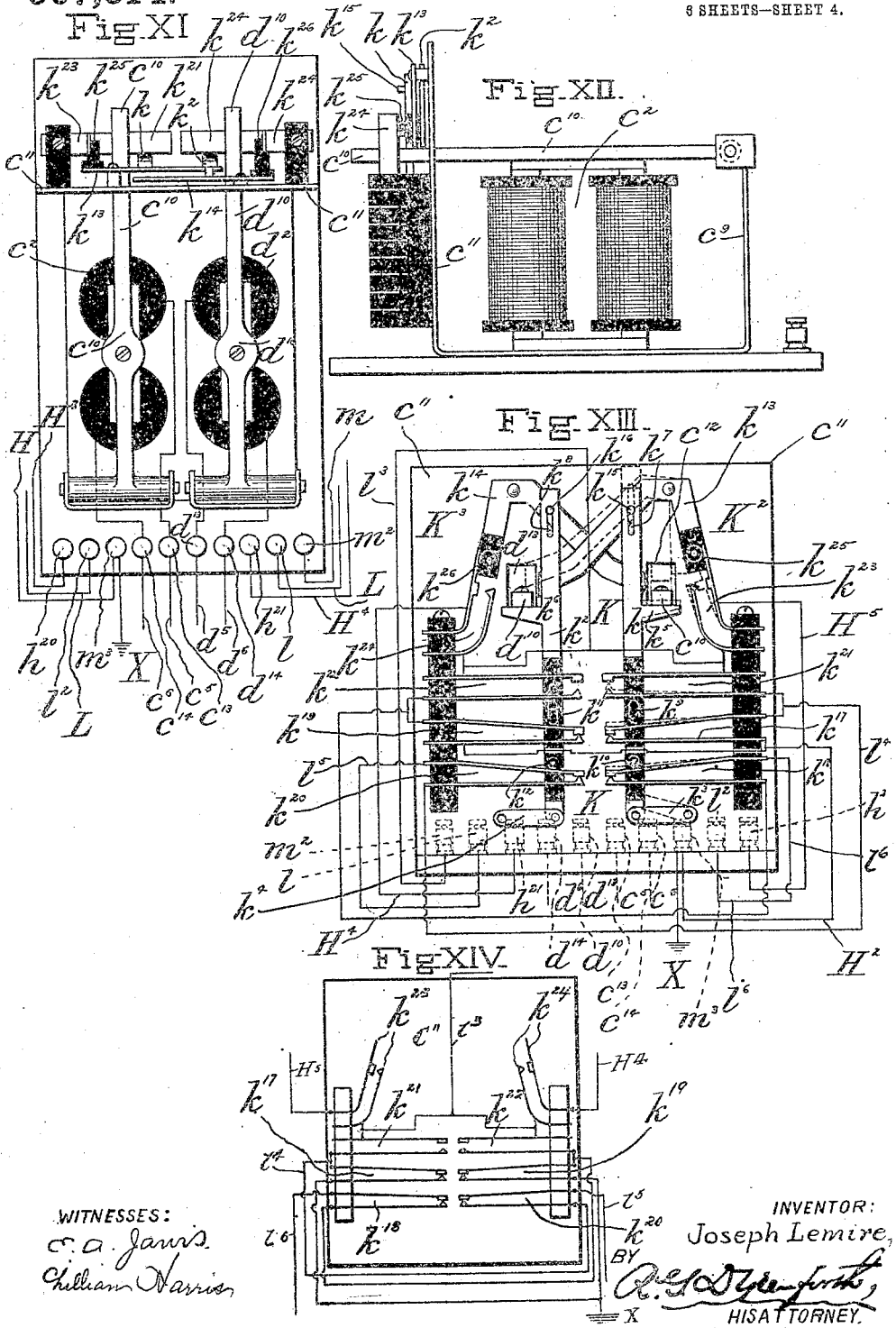

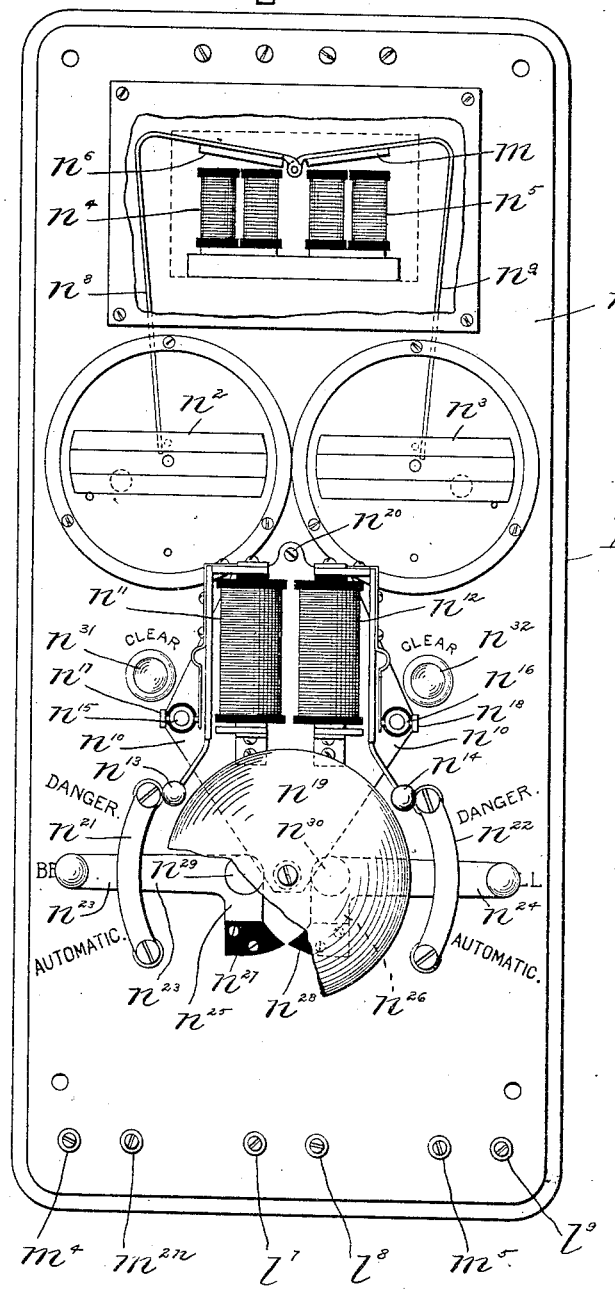

UNITED STATES PATENT OFFICE.

JOSEPH LEMIRE, OF DRUMMONDVILLE, QUEBEC, CANADA.

COMBINATION AND MANAGEMENT OF ELECTRIC CIRCUITS AND THEIR APPLICATION TO RAILWAY SIGNALING SYSTEMS.

No. 907,614.   Specification of Letters Patent.   Patented Dec. 22, 1908.

Application filed October 3, 1907. Serial No. 395,311.

*To all whom it may concern:*

Be it known that I, JOSEPH LEMIRE, a subject of the King of Great Britain, residing at Drummondville, in the county of Drummond in the Province of Quebec, Canada, have invented certain new and useful Improvements in Combination and Management of Electric Circuits and their Application to Railway Signaling Systems; and I do hereby declare the following to be a full, clear, and exact description of the invention, such as will enable others skilled in the art to which it appertains to make and use the same.

The general object of my invention is, by make, or break, of an electric current in or under a condition of entire safety, to bring into operation a current of greater electromotive force and to control this to do work, as desirable, or desired.

My invention consists, broadly, in the combination of three elements, namely, two electric circuits, one having a current of lower pressure than the other and break, or make, in which brings into action the other, and mechanism for managing the current of this other and directing its action.

The object of the invention, as here applied and illustrated, is to afford safety and protection in railroads to the public and to the railroad corporations themselves, absolutely preventing collisions,—head - on, or rear-end,—and eliminating accident incident to a broken, or misplaced, rail, or the removal of a rail, to an open switch, or bridge;
to the projection of a train from a siding onto the main track; to the carelessness, or incapacity of a station attendant, -agent, or operator; to a fog, or smoke; to color-blindness in an engine-driver, or so-called engineer; or to his being asleep, or dead; and so forth; and it consists, therefore, also, in the subject-matter substantially as described and claimed.

The characteristic feature of the invention, as here applied, is that the signal is, normally, at "Danger" and will automatically indicate "Safety" only when break, or make, in an electric circuit finds a predetermined condition at another part thereof; in the present case, the illustration of the invention being that the signal (in this instance a semaphore) resting normally at "Danger", will move automatically to show "Safety," or "Clear", only when, with proper connections in order, the electric track-circuit, when broken at one part, is found closed at every other.

In the accompanying drawings, forming a part of this specification, and in which like letters and other marks of reference indicate like parts, I have shown one system, as an example, for carrying my invention into effect on a single track; (though, of course it, is, also, applicable to a double track), and one example, each, of various devices by which my system, as here illustrated, may be operated; and, in these drawings—

Figures I and II are general views in diagram, showing an appropriate arrangement of devices suitable for the system, Fig. II being, at its first portion, a reproduction of the latter portion of Fig. I, but, otherwise, a continuation of Fig. I, the figures together exhibiting a track and sidings divided in blocks and sub-blocks and indicating low-pressure track batteries and their relays, track-switches and their alarms, signals, high-pressure motor-operating batteries in connection with such signals, instrumentalities for sounding an alarm on a passing locomotive, when the signal is at danger, line and other wires, and the combined indicator and station-signal controlling device for the station-agent. Fig. III is a front elevation, with parts in section, showing in full lines, signal set at "Danger," and in dotted lines, at "Clear;" a suitable form of motor for operating the signal, instrumentalities for sounding an alarm on a locomotive, sub-block electro-magnets which control the actuation of the signal motor through a mechanically operated current directing instrument, together with electrical connection for the several parts. Fig. IV is a view in side elevation, with parts broken away, showing a form of switch-stand of the invention together with an alarm device and instrumentalities for sounding the same under predetermined condition of the switch. Fig. V is a view, in perspective, of the switch-stand shown in Fig. IV. Fig. VI is a plan view of the motor for operating the signal, and the several parts operatively associated therewith. Fig. VII is a view in side elevation of the signal operating motor and parts associated therewith. Fig. VIII is a perspective view of the device employed in connection with the signal operating motor for making and breaking the circuit in which the electro-magnet is included, which, through its armature, imparts an intermittent movement to the signal operating motor. Fig.

IX is a fragmentary view in vertical longitudinal section taken on line X—X of Fig. VI, and looking from right to left showing the weighted drum with an eccentric on its end next the power wheel, and the sector on the eccentric and lying flat in the recess in the drum side face of the power wheel. Fig. X is a view in elevation taken from the drum side of the power wheel. Fig. XI is a view in plan looking down upon the magnet frame from the front of Fig. III, showing the electro-magnets in pairs, and the armature to each pair, with relative position of the armature to the instrument. Fig. XII is a side elevation taken from the left of Fig. XI showing the base, magnet-frame thereon, binding posts, hinged armature, and instrument on the rear face of the back plate of the magnet-frame. Fig. XIII is a view in elevation looking at rear face of the back-plate of the magnet frame, showing the instrument thereon with its two groups of mechanism, one on each side, each group to act from its respective sub-block of track and relative to and through the other group, as here in dotted lines shown, the left hand group, or group on the right of this view, being in direct action. Fig. XIV is a view in diagram, showing the electric circuits of the instrument. Fig. XV is a view in elevation, showing the front of an indicator-and-station-signal-managing device of my invention, suitable for employment in my system, and appropriate wiring therefor. Fig. XVI is a view in elevation, showing the back of my indicator-and-station-signal-managing device and the proper wiring therefor. Fig. XVII is a perspective view, showing the left-hand turn post, segment, and switch-disk, (appearing at the right in Fig. XVI) displaying the relative positions of the segment and disk on the post.

A railway track is divided into electrically separate blocks of any proper length, a mile for instance, each, with sidings and switches, as usual. Each block has, at one end, a low pressure battery, and at the other end, a relay, as shown. Should there be a short circuit in any way, as by a passing train, car from broken train, open switch, or a broken circuit as by broken or loose rail, broken wire, open bridge or the like, the current will not pass through the coils of the electro-magnets of the relay, and the armature will fall.

The siding will be divided into blocks, though, generally, of much less length than the blocks of the main track,—with wire connections to the main track, so that a track battery will be short circuited and the line broken, if a train on the siding be inadequately far from the main track; furthermore, the switches on the siding are in electric connection with the main contacts for the sub-block immediately in advance, and provided with a bell at the switch, so that when a train gets on that sub-block, should a switch between that semaphore and at first one to the rear have been left insecurely fastened, current is brought from the high-pressure battery of that semaphore to ring the bell whereby immediate warning is given at the switch.

At the side, or sides, of the track, in a position near the adjacent ends of two blocks, are arranged signals, electrically connected through the relay by a wire which constitutes the line wire and conveys current from a high-pressure battery from one signal to another, through the armatures of the relays when these are closed and the circuit is complete.

Between adjacent blocks of the track are two sub-blocks, each, of about a thousand feet in length, and insulated at both ends. Like the block, each sub-block has a low-pressure sub-block track-battery at one end and a relay at the other end, the relay being located at the signal and the end of the sub-block next the other sub-block of the pair. This relay acts in a manner directly opposite to the main line relays, that is to say, when in its normal or closed position, it breaks the main electric circuit, and when in open position, permits closing of the main electric circuit. Briefly, when the track-circuit of a sub-block is not broken, the armature is attracted and held against spring pressure, such spring pressure, acting upon release of the armature—due to breaking or short-circuiting of the sub-block track-circuit—to raise the armature and cause certain primary contact points to come together and certain secondary contact points to separate, the main contact points connecting through a motor, a high-pressure battery, and the secondary contact-points of the next sub-block in advance to close the line circuit, operate the motor and move the semaphore to indicate "Clear." The device by which the current is thus automatically controlled and directed is termed the instrument.

To further obviate possibility of accident, in case, for some reason or other, the usual signal is not seen, an additional battery is placed at the signal, one pole connecting with a short bar in the track at the signal and the other with one side of the track, its terminals being so positioned that they will close when the semaphore is at "Danger," whereby when a locomotive is provided with a metallic brush to contact with the bar, and a siren or other signal arranged and connected to be operated by the closing of the circuit, an alarm will be sounded on the locomotive. It is to be borne in mind that the signal is, normally, to be "Danger", and the semaphore is to show "Clear" only so long as the train is in the incoming sub-block, to indicate the safe condition of the adjacent sub-block in advance. The motor will be cut out and the signal return to normal "Danger" position as soon as the train enters the adjacent sub-block in advance.

Stations will be located along the track, each between two semaphores, and provided with a tell-tale-semaphore-and station-signal-controlling device, which, for short, may be called a switch-board, this switch-board always being located between the high pressure battery and the particular semaphore to which it appertains. The purpose of the switch-board is to advise the station agent of the approach of a train, and the position of an adjacent semaphore, and to enable him thereupon to let the train advise itself, that is, let the signal indicate automatically whether to proceed, or not, and to enable him to stop a train even though the signal may indicate a clear passage, or let it proceed as far as the station, even though the signal may be to stop.

Referring to the drawings, A designates the blocks, $a$ the block-batteries, and $a^2$ the relays. The positive poles of the block-batteries are connected by wire to either side of the track, but all in accord, as, here, by wire $a^3$, to the far side, the other pole by wire to the other, as by wire $a^4$. The relays have one end of their coils, as by wire $a^5$, connected with the one side of the track and the other end, as by wire $a^6$, connected with the other, whereby, as common to relays, the current will be through the wire and the armature be attracted, and it will be obvious that, if there be any break of the current in the track, as by short-circuiting through the wheels and axles of a passing train, or a broken, or loose, rail, the armature will cease to be attracted. The sidings marked B are also divided into blocks, though generally, of course into shorter blocks, which may be suitably connected to the adjacent blocks of the main track. The wire $b^2$ is connected to the siding, and operates to short circuit the block-battery, whenever the siding has its frog against the the main track, that is, when there is a so-called open switch.

The sub-blocks are marked C, D, E, F; the sub-block batteries to these sub-blocks, respectively, $c, d, e, f$; the sub-block electro-magnets in function, as causing make or break of a circuit, relays, set in pairs, are marked $c^2, d^2, e^2, f^2$, the wires connecting the sub-block batteries with the rails of the sub-blocks $c^3, c^4, d^3, d^4, e^3, e^4$, and $f^3, f^4$; and the wires connecting the sub-blocks with the sub-block electro-magnets $c^5, c^6, d^5, d^6, e^5, e^6$, $f^5, f^6$. These pairs of electro-magnets have, by their armatures, to exert considerable mechanical force and, with one armature for each pair, are arranged in double pairs at each signal, each pair to a respective sub-block, in frames $c^7, f^7$, placed upon a base-plate, $c^8, f^8$. The frames have front plates, such as $c^9$, upon which are hinged independently of each other, the armatures, such as $c^{10}, d^{10}$, one to each pair of electro-magnets, and a back plate, such as $c^{11}$, provided with two openings $c^{12}$ and $d^{12}$, through each one of which the free end of the respective armature $c^{10}, d^{10}$, of the respective pair of magnets $c^2, d^2$ protrude. The signal employed in connection with the present apparatus is marked G, its semaphore $g$, and the rod connected thereto $g^2$.

Suitably arranged at the sidings are switches, each preferably adapted to give alarm should it be left in insecure condition. A form of switch, here applicable, is shown in Figs. II, IV, and V of the drawings, and is connected with a bell to ground. The switch is marked H, and the bell $H^2$. The switch consists of a stationary support, or body, $h$, having an angular recess $h^2$, in its top, and a circular recess $h^3$ in its bottom connected, centrally, by a tubular opening $h^4$, a shaft $h^5$, angular at its upper part, but cylindrical in the rest of its length, extending through the body and carrying, fixed to its lower end, a circular plate $h^6$, which fits loosely in the circular recess in the bottom of the stationary support, and has a pin $h^7$ on its under surface, toward its periphery, to which is pivoted the usual bar to the track-rail; furthermore, of an angular head $h^8$, provided, in front, with a downward-projecting horn $h^9$ and, behind, with a staple, or a lug, $h^{10}$, perforated near its outer end, the head $h^8$ having an angular neck $h^{11}$ fitting into the angular recess $h^2$, in the top of the stationary support, and there being, centrally, an angular opening $h^{12}$ longitudinally through the head and the neck, by which the head is fitted free to slide up and down on the angular upper part of the shaft; furthermore, of an operating-lever $h^{13}$ pivoted, at its front end, in the top of the shaft and, at each side, to a strap $h^{14}$, which, in turn, is pivoted to the side of the head; and, finally, in connection with the stationary support, a casing $h^{15}$, having, within, but insulated from it, two sets of contact-springs $h^{16}, h^{17}$, connected, respectively, with the bell and with a line-circuit, and containing a vertical, spring-seated rod, or plunger, $h^{18}$, bearing, insulated from it, a metallic collar $h^{19}$, to contact with the upper springs and pass current to the bell and to ground when the operating lever, or switch-handle, is not fastened, but sprung up, that is, when the switch, as usually expressed, is open, as in the example here appearing, or through the collar to line, when the lever is fastened.

The electric motor to move the signal is preferably located at the semaphore, and, as here shown, is within its area and may be cased. The motor is marked I, and is supported on the base $i$. The motor-magnets, marked $i^2$, are held between angle-plates $i^3$, $i^4$, fixed upright on the base. A swinging armature $i^5$, taking, on release, against a buffer-spring $i^6$, has, pivoted to it, centrally, one end of an actuating-rod $i^7$, the other end being pivoted to an arm $i^8$ fixed to and extending downward from the lower part of a solid drum $i^9$, turning, or rather, free to oscillate, on a cross-shaft $i^{10}$, which is journaled at its ends, in uprights, or pillars, $i^{11}$, $i^{12}$, of which the one $i^{11}$ at the drum has a stop-bar $i^{13}$, another arm $i^{14}$ weighted at the top extending upward from the upper part of the drum and always leaning toward the armature, serving to throw the drum over, downward and backward, and, by the other arm $i^8$ and the rod $i^7$, pull away the armature on its release, also giving the drum a sudden impulse; and the rod $i^7$ having, between its ends, an adjustable cross-head, chuck, or block $i^{15}$, provided with a laterally-extending pin $i^{16}$, adjustable both longitudinally and up and down by being fixed in the cross-head. The drum has, cut or applied on, its inner end an eccentric, or cam, $i^{17}$, and upon the eccentric is fitted, at its narrow end, a sector $i^{18}$, having a pin $i^{19}$ to take upon the stop-bar $i^{13}$. Power wheel $i^{20}$, is secured on the cross-shaft, $i^{10}$, at a position just beyond the eccentric, $i^{17}$, and is provided with a recess, $i^{21}$, in which the sector, $i^{18}$, lies flat. When the drum with the eccentric is turned upward by the movement of the parts upon attraction of the armature, the eccentric, engaging the sector, moves the same outwardly to engage the rim of the wheel, $i^{20}$, and at the same time upwardly, thereby giving the wheel a partial rotation. Upon release of the armature, the weighted arm, $i^{14}$, drops quickly, causing the sector to be moved downwardly and away from the rim of the wheel and in a position to reëngage the arm upon the next attraction of the armature. The falling of the weighted arm and receding of the sector is accomplished instantaneously so that there is not sufficient time to permit of the return of the wheel, $i^{20}$, and its connected signal before the armature is again attracted and another impulse given to the sector. To the power wheel is pivoted the actuating-rod, $g^2$. The mechanical part of this device constitutes a very powerful mechanical movement. As the sector $i^{18}$ must be given a step-by-step motion, to move the power-wheel, provision is made for make-and-break of the current, even when the circuit is otherwise steadily complete.

From the magnets $i^2$, a wire $i^{22}$ leads to a fixed terminal $i^{23}$, on an insulating slab $i^{24}$. On this insulating slab is a metallic rock-box, or block $i^{25}$, from which a wire $i^{26}$ leads to the outflow post $i^{27}$. The box is pivoted longitudinally of the base and free to oscillate, has an upward-extending contact-spring, constituting a movable terminal, $i^{28}$, opposite the fixed terminal and in contact with it, when the box is not pushed up, and an inward-extending hand $i^{29}$, like a right-hand with the back upward and only the index-finger $i^{30}$ extended, bearing a U-shaped leaf, set slanting downward with the bow up, one leg $i^{31}$ of the U being fixed upon the back of the hand and the other free end forming a spring $i^{32}$ extending downward upon and beyond the finger, the pin $i^{16}$ on the cross-head $i^{15}$, upon attraction of the armature and movement forward of the rod $i^7$, taking over the finger $i^{30}$, and under the spring $i^{32}$, between the finger and the spring, holding the finger down, and thus the box $i^{25}$, keeping the terminals $i^{23}$, $i^{28}$ in contact, until the pin passes down and is snapped downward off the finger by the spring, which, then, pressing against the pin, raises the box and throws the terminals out of contact, whereupon, on release of the armature and movement backward of the rod by the weighted arm of the drum, the pin passes back and, as the finger is raised with the box, passes under the finger, holding it and the box up, keeping the terminals out of contact, until the finger slips off, when the box drops, and the terminals again come into contact; the parts being arranged, as shown, with their movements timed, so that contact is broken the instant the armature touches the cores of the magnets and, through the parts, the make and break of current and the weight give the drum and, thus, the wheel-moving sector a succession of impulses.

There may be a device J, generally to give an alarm on the locomotive should the signal be at danger and, for any reason, not be seen by the engine-driver. This consists of a small battery, at each semaphore, marked $j$, the positive pole of which is connected with short bars $j^2$, $j^3$ at the sub-blocks, and the other pole, through spring-contacts $j^4$, $j^5$, with one or the other of the rails of the sub-blocks, as shown in Fig. 1. The contacts are held apart by the power-wheel of the motor when the signal is clear; but are together when the signal is at danger. Should, now, a train pass while the signal is at danger, then, by a brush from the locomotive, the current may be taken from the bar, such as an alarm, on the locomotive, as by means of a relay, opening a siren on the locomotive. The point, now, is, by the current from the high-pressure battery, automatically to effect protection. To this end, I have devised the instrument, or current-director, K, which is the same for each semaphore, so that description of one will suffice. It is placed on the rear face of the back-plate $c^{11}$ of the magnet-frame. This instrument consists of two like groups $K^2$, $K^3$, one on each side of the plate, one for each sub-block, each acting, initially, from its sub-block, but each coördinate with the other, that is, acting through and with the other.

Referring, particularly, to Fig. XIII and to conform to the illustration hereafter given, let the group $K^2$ be considered the first group. This group, while appearing upon the right of the figure, is, as the plate is reversed, of course, the left group of the instrument. Placed, flat, upon the rear face of the back-plate of the magnet-frame are two vertically-arranged bars $k$, $k^2$, pivoted at their lower ends to the inner ends of two laterally-arranged straps $k^3$, $k^4$, which, in turn, are pivoted at their outer ends to the plate. The bars are provided with seats $k^5$, $k^6$, upon which bear and rest, normally, the outer ends of the respective armatures $c^{10}$ $d^{10}$, of the respective electro-magnets $c^2$, $d^2$, of the sub-blocks C, D, these armatures protruding through the openings in the back-plate of the magnet-frame; and, at their upper ends, the bars have, each, a vertical slot, the vertical slot of the bar $k$ being marked $k^7$ and that of the bar $k^2$ being marked $k^8$; while, toward their lower ends, the bars are provided, each, with two studs, marked, respectively $k^9$, $k^{10}$, and $k^{11}$, $k^{12}$. At the upper part of the plate are two bent arms $k^{13}$, $k^{14}$, each consisting of a shoulder-piece and a fore-arm and pivoted at the elbow to the back-plate. Each arm has a pin in its fore-arm, by which it is pivoted in the slot of its respective bar, and, when the bar is down, the fore-arm will be pulled downward and the arm rocked outward upon the pivot at its elbow. The pins are marked, respectively, $k^{15}$, $k^{16}$. At each side of the plate, set vertically, is a block of insulation, and protruding inward from these are metallic springs, in pairs. The lower pairs of springs of the first group are marked $k^{17}$, $k^{18}$, and have their upper springs bearing, respectively, against the studs $k^9$, $k^{10}$; while the lower pairs of the springs of the other group, marked $k^{19}$, $k^{20}$, have their upper springs bearing, respectively, against the studs $k^{11}$, $k^{12}$. Immediately above the upper stud of each bar is another pair of springs, the pair above the stud of the bar of the first group being marked $k^{21}$, and the other pair $k^{22}$, and, above these pairs of springs, are two further pairs of springs, one pair for each side and marked, respectively, $k^{23}$, $k^{24}$. These pairs of springs, after projecting inward, curve upward to the shoulder-pieces of the arms, the upper spring of each pair being longer than its fellow and, of the pair $k^{23}$, the upper spring bearing against a stud $k^{25}$ on the shoulder-piece of the arm $k^{13}$, and the other upper spring bearing against a stud $k^{26}$ on the shoulder-piece of the arm $k^{14}$.

The action of the device is as follows: Both armatures being attracted and both bars down, should the bar of the first group, that is, the bar $k$, upon release of the armature which held it down by bearing on the seat $k^5$, rise by pressure of the upper springs of the spring-pairs $k^{17}$, $k^{18}$ against its studs $k^9$, $k^{10}$, this causes separation of the upper and lower springs of these pairs, brings together the springs of the pair $k^{21}$ and by release of the fore-arm of the arm $k^{13}$, the raised bar ceasing to pull it down by the pin and rock the arm outward, brings together the springs of the pair $k^{23}$, the upper spring of this pair also rocking the arm $k^{13}$ inward and projecting its fore-arm somewhat across the upper part of the opening in the back-plate for the free end of the armature of the opposite side and over this out of the way. Both armatures being attracted and the bars down, should the bar of the opposite group rise, the action would be just the same for that group. Should the armature and the bar of either group rise, while those of the other are up, the end of the fore-arm of the group of the armature last rising would take against the risen armature of the other group and thus, prevent movement of the arm and coming together of its pair of upward curved springs, the bar having risen nevertheless, by sliding, by its slot, on the pin in the fore-arm. Thus, should the armature $d^{10}$ holding down the bar $k^2$, be released, while the armature $c^{10}$ and bar $k$ are up, the bar $k^2$, by sliding on the pin in the fore-arm of the arm $k^{14}$, would rise, letting the spring-pairs $k^{19}$, $k^{20}$, separate, and closing the spring-pair $k^{22}$; but the arm $k^{14}$ would be held from rocking inward by the end of its fore-arm taking against the risen armature $c^{10}$ of the first side, and the springs of the pair $k^{24}$ would be held apart. Should the armature of the first group now be attracted, it cannot fall, being held by the arm $k^{14}$ until the armature of the second group is attracted, whereby its arm by the bar is pulled away; and reflex action is prevented. But all the springs serve at times as electric contact-points, though some, as seen, have mechanical function, as well.

It will be observed that the base, on which the instrument-electro-magnets and the instrument are supported, is provided with ten binding-posts. Of these, $c^{13}$, $c^{14}$, $d^{13}$, $d^{14}$, and, on the next semaphore, $e^7$, $e^8$, $f^9$, $f^{10}$, are for the respective track-wires $c^5$, $c^6$, $d^5$, $d^6$, $e^5$, $e^6$, $f^5$, $f^6$, connecting the respective sub-blocks with their sub-block-electro-magnets. The second binding-post from each end is a post for the main semaphore-line L, that is, the line which connects the semaphores, and has in it the relays from the track-batteries, and these posts are marked, respectively, $l$, $l^2$, the post $l$ being for the line to the advance semaphore, and the post $l^2$ for the line coming from the next semaphore to the rear; the binding-post at the extreme left and the third binding-post from the right, marked, respectively, $h^{20}$ and $h^{21}$, are the binding-posts for the switch-bell-lines $H^3$, $H^4$; while the binding-post at the extreme right is the post for the feed, supply, or lead-line $m$ from the high-pressure battery M at each semaphore, and is marked $m^2$; and the third post from the left end, marked $m^3$, is to ground, X.

Now, the action is as follows: Suppose a train to enter the sub-block C. This at once short-circuits the battery $c$, cuts the current to the electro-magnets $c^2$, and releases the armature $c^{10}$ of the bank of electro-magnets $c^2$, whereupon the bar $k$, of the first group of the instrument K, rising by pressure of the upper springs of the lower pairs $k^{17}$, $k^{18}$, separating these, brings the springs of the spring-pair $k^{21}$ and $k^{23}$ into contact, and current from the high-pressure battery is by the feed-wire $m$ to the extreme right-hand post and, thence, by wire $l^3$, to the spring-pair $k^{21}$, thence, by the wire $l^4$, to the spring-pair $k^{20}$ of the opposite group at this semaphore, and, thence, by the wire $l^5$ to the second binding-post $l$ from the right, to the line L, to the second-binding post $l^2$ from the left of the first group of the next semaphore in advance, and, thence, by the line $l^6$ to the lower contact spring-pair $k^{18}$ of the first group of the next semaphore, to the second spring pair $K^{19}$ of the other group, and by wire $H^2$ to the third binding-post $m^3$ from the left of the first group of the said semaphore in advance, and to ground X (that is, if all is clear between the semaphores), completing the circuit, bringing the motor into action, and moving the first semaphore.

In addition to the current passing through the spring-pair $k^{21}$ to the main semaphore line L, it also passes by the upward curved spring-pair $k^{23}$ and by line $H^5$ to the post at the extreme left $h^{20}$ and thence to the switch-line $H^3$, back to supply current to the alarm circuit at the switch stand and thereby protect the switches. If the entrance of a train should be, initially, into the sub-block D, the action would be precisely the same as in the present case, excepting that it would be in the opposite direction, and the "semaphore in advance" would be the first semaphore in the opposite direction. Should, now, the train pass into the sub-block D, while part of it is still in the sub-block C, as both pairs of lower contact-springs of each group would be open, even though the spring-pairs $k^{21}$, $k^{22}$ would be closed, the current of the high-pressure battery would be cut, the motor would no longer act, and the semaphore would fall to indicate danger; but it will be remembered that, when the pair of upward-curved springs is closed, current is also to them and, while it is proper that the springs of the upward-curved spring-pair $k^{23}$ should close to send current back to protect the switches, yet, if the upward-curved spring-pair $k^{24}$ of the opposite group should close, current would get through the switch-line of that group, by the main semaphore-line to ground and overlap would thus move the semaphore. It is to avoid this that the fore-arm of the group in which the bar rises secondarily, takes against the risen armature of the group in which the bar rose first and keeps the springs of the upward-curved spring-pair apart. As the train now gets entirely into sub-block D, as the bar of this group is still up, the fore-arm of the arm $k^{14}$ of this group continues to press against the armature $c^{10}$ of the first group and keeps it from falling, upon attraction, so that the upper contact-springs of the pair of the first group remain open, and both bars remain up until the train leaves the sub-block D toward the sub-block E, which obviates the sending of a current back through the group of the sub-block C to the semaphore next in the rear, as if the train had entered the sub-block D initially. As the train enters the sub-block of the next semaphore, the current is, of course, forward over the main line to the next semaphore in advance, and back over the switch-line $H^3$ to this semaphore. It will be understood that, a train coming from the opposite direction, action will be, in every respect, just the reverse.

Placed between some two signals is the station and, preferably, beyond the switches of the adjacent semaphore, between the high-pressure battery of that signal and the signal; and into this station, I may introduce my tell-tale-semaphore-and-station-signal-managing-device N. This device consists of a wooden board $n$, having, at its bottom, six binding-posts, instead of ten,—no track-wires acting directly on this device,—and the feed-wire $m$ from the high-pressure battery passes directly to a post $m^{2n}$, carrying the current through the device and out through a post $m^4$ to the continuation of the feed-line $m$ to the motor, back by the post $l^7$ and out through the post $l^8$ to the semaphore-line in advance, the post $l^9$ being for the main semaphore-line for the semaphore in advance, but coming the other way, and the binding-post $m^4$ being for the battery-line $m^5$ to ground Y.

Toward the top of the board, in front, are two tell-tale semaphores $n^2$, $n^3$, in recesses under glass, the one $n^2$ being of the station-semaphore, and the other $n^3$ of the semaphore ahead, supposing the train to be moving from right to left. Above these tell-tale semaphores are their electro-magnets $n^4$, $n^5$, and armatures $n^6$, $n^7$, and the actuating-rods $n^8$, $n^9$, from these, there being one set of these magnets and one armature for each tell-tale-semaphore, and each armature being movable independently of the other. Below the tell-tale-semaphores, arranged on a metallic plate $n^{10}$, practically insulated by being on the board are, one for each side, bell electro-magnets $n^{11}$, $n^{12}$ with their vibrators $n^{13}$, $n^{14}$, (that is, spring-knee armatures with their hammers and contact-springs) and insulated vibrator-posts $n^{15}$, $n^{16}$, having adjusting-screws $n^{17}$, $n^{18}$, the gong $n^{19}$, being between the vibrators. At the top of the plate $n^{10}$ is a contact-screw $n^{20}$, connecting with the plate, the vibrator-posts connecting, through the vibrators, with the plate and from the contact-screw to ground, all about as usual.

Two arc-shaped racks $n^{21}$, $n^{22}$, one on each side of the gong, are set upright, and have marked, opposite their centers, the word "Bell," opposite their lower ends, the word "Automatic," and, opposite their upper ends, the word "Danger." Two hand-levers, or electric switch-keys, $n^{23}$, $n^{24}$, have, respectively, hangers, or legs, $n^{25}$, $n^{26}$, with curved insulated feet, $n^{27}$, $n^{28}$, where they would touch each other, and, at their inner ends, are fixed upon the outer, or front, ends, respectively, of turn-posts $n^{29}$, $n^{30}$, free to be turned in either direction, but limited in motion by the racks through which their hand-levers extend; and each turn-post is positioned, normally, with its hand-lever and the contacts which it carries, as shown in Fig. XV, for the bell, either lever being capable of movement to "Bell," while the other is there, or elsewhere, to make it possible for the bell to ring, as a warning, from both sides, from either side, or from one side only, either lever being capable of movement to "Danger," while the other is there, or elsewhere, breaking the circuit from both sides, or from either side, as to stop trains, or a train, even though, without this, the signal might mark clear,—but, by provision of the hangers, or legs, and their feet, incapable of movement to "Automatic," while the other is there, to obviate counter, or opposing, currents and inaction, the one side being at "Automatic," the other, whether at "Bell," or at "Danger," if the line is broken in advance, taking the current to the bell (as shown in Fig. XVI). Push-buttons $n^{31}$, $n^{32}$, one for each side, have the word "Clear" marked over them, and are to enable the station-agent to ground the current through the motor, when broken in advance, and unbroken between the station and the train, that is, there being no danger between train and station and, thus, cause the semaphore to move and make the signal clear, as to bring an incoming train, "blocked" on the sub-block, up to the station.

Fixed on the extreme back, or inner end of the turn-posts $n^{29}$, $n^{30}$,—but from or by them insulated,—are segmental contact-makers-and-breakers $n^{33}$, $n^{34}$, set with their cut-off positions, or chords, upward, and, in front of these, free from them, are flat, circular plates, or metallic disks, divided, appropriately, into sections, as into three sections, middle sections $n^{35}$, $n^{36}$, lowermost sections $n^{37}$, $n^{38}$, and uppermost sections $n^{39}$, $n^{40}$, all suitably insulated to constitute an electric switch-plate. Pairs of contact-springs $n^{41}$, $n^{42}$, extend downward, slanting inward from an insulating-block (such as a wooden block) above, respectively, to the sides of each segment $n^{33}$, $n^{34}$, both springs being in contact with their respective segments, when its hand-lever is straight outward from its post, that is, at "Bell," or when turned down to "Automatic," but the inner spring, being out of contact with its respective segment, when the hand-lever of this segment, is pushed up to "Danger." Two insulated, flat, bifurcated, metallic contact-springs, or two-tined forks, $n^{43}$, $n^{44}$, each having its tines of different lengths, extend upward from the inner face of the board, to and upon the faces of their respective disks, toward the inner edges thereof, and have their longer tines in constant and sole contact with the middle section of their respective disks, and their shorter tines, upon movement of the disk to "Automatic," capable of contact with the lowest sections, and the middle sections of their respective disks, but neither tine of either fork ever coming into contact with an uppermost section thereof. Two further insulated flat, bifurcated, metallic contact-springs or two-tined forks, each with tines of different lengths, these second bifurcated springs or forks being marked $n^{45}$, $n^{46}$, extend upward from the inner face of the board to and upon the faces of their respective disks, toward the outer edges thereof, the shorter tine in constant contact and sole contact with the lowest section of the disk and the longer tine upon movement of the disk to "Automatic," capable of contact also with the uppermost section of the disk. Wires $n^{47}$ and $n^{48}$ connect one of the outer fork springs with the semaphore line in advance.

Extending downward from the inner face of the board upon the faces of the disks, toward the inner edges thereof, are two insulated, flat, plain, metallic contact-springs $n^{49}$, $n^{50}$, each contact-spring capable, upon movement of the disks to "Bell," or of one disk to "Automatic," of contact with the middle section of its disk, upon movement of either or both disks to "Danger," of contact with the uppermost section. Furthermore extending downward from the inner face of the board upon the faces of the disks, toward the inner edges thereof, but outside the other downward-extending, flat springs, are two further insulated, flat, plain, metallic contact springs $n^{51}$, $n^{52}$, these being in constant and sole contact, each with the uppermost section of its disk, and each connecting with the lower spring of the push-button on its side of the board by wire, these springs being marked $n^{53}$, $n^{54}$. Thus, when a disk, as properly set, has its lever-handle, or key at "Bell," the first lower, or inner, fork spring, with both its tines, and the first, or inner, upper flat spring are on the middle section (the second lower or outer, fork spring, with both tines, on the lowest section, and the second, or outer, flat spring, of course, on the uppermost section); when at "Automatic," the first fork spring has its long tine on the middle section and its short tine on the lowest section, the second fork spring has its short tine on the lowest section and its long tine on the uppermost section, and the first or inner, upper flat spring is on the middle section, functionally, between the first lower fork spring and the middle section, keeping in the resistance of the bell-magnets, and short circuit is afforded from the first fork spring $n^{43}$ across the lowest section to the second fork spring $n^{45}$ and wires $n^{47}$, $n^{48}$, by post $l^8$ to the main semaphore line in advance, or, if the line is broken, still to let the bell ring; or, the short tine of the first fork spring being on the lowermost section, the second fork spring having its short tine on the lowermost section and its long tine, with the second upper flat spring (as ever) on the uppermost section,—though the first upper flat spring is also there,—if the respective push-button be pressed short circuit is afforded from first fork spring $n^{43}$ across the lowest section to the short tine of the second fork $n^{45}$, to its long tine, by this to the uppermost section, and across this to the second upper flat spring and from this by connection with the push-button springs and screw $n^{20}$ and wire to ground Y, all as shown in Fig. XVI; while, when a disk is at "Danger," its first spring has both tines on the lowest section, and both upper springs are on the uppermost section, so that the current through the disk, as well as through the segment, is broken.

Suppose the train to enter the sub-block E upon which the illustration in Fig. II of the drawings is founded. From the source of power by the line $m$, to the second binding-post from the left $m^{2n}$, the handle being at "Bell", the current passes by the post $l^7$ to the fork-spring $n^{43}$, from it to the middle section $n^{35}$ of the disk, thence by the relative upper flat spring $n^{49}$, to the bell-magnets $n^{11}$, thence to the vibrator-post $n^{15}$, and by this vibrator-post through the vibrator to the upper part of the metallic plate $n^{10}$ to the screw-post $n^{20}$, and by the wire to ground Y. Upon hearing the bell, on this side, the station-agent, or operator, pushes the key down to "Automatic", and the main line, in advance as well as behind closed, the current passes from the short tine of the fork-spring $n^{43}$ and by the lowest section $n^{37}$ of the disk, by the short-circuit across this section, to the relative lower spring $n^{45}$, and from this, by wire $n^{47}$, to the wire $n^{48}$, and thence by the binding-post $l^8$ to the main semaphore-line L in advance, if the line in advance is closed, and, then, all connections being closed, the semaphore moves. The action will be the same from the other side if the train first enters the section T, as will be seen from inspection of Fig. XVI. If the operator sets the disk at "Danger", or pushes the push-button of this side, the current is either broken, which leaves the semaphore at "Danger", or by the vibrator-post to ground, as will be obvious on inspection of Fig. XVI.

Having thus fully described my invention, and some of the means of carrying it into effect, what I claim and desire to secure by Letters-Patent is:

1. The combination with a track divided into sub-blocks, a signal operating circuit including an element of each independent circuit, a plurality of pairs of contacts in said signal operation circuit, and means controlled by each sub-block circuit for opening the contacts of one pair and closing those of the remaining pairs.

2. The combination with a track divided into sub-blocks, of an independent circuit for each sub-block, a signal operating circuit including an element of each independent circuit, a plurality of pairs of primary and secondary contacts in said signal operating circuit and arranged to be alternately opened and closed upon varying conditions of the sub-block circuits.

3. The combination with a track divided into sub-blocks, of an independent circuit for each sub-block including an electromagnet, a signal operating circuit including the armatures of the electro magnets of each sub-block, pairs of primary and secondary contacts in said signal operating circuit being controlled by the rising and falling of the armatures of the electro magnets in adjacent sub-blocks.

4. The combination with a track divided into sub-blocks, of an independent circuit for each sub-block, a signal operating circuit including an element of each independent sub-block circuit, pairs of primary and secondary contacts arranged in the signal operating circuit for each sub-block, and instrumentalities for moving the semaphore upon the closing of the pair of primary contacts of one sub-block and the pair of secondary contacts of the sub-block next in advance.

5. In a signaling system, the combination with a track, of a signal, and a continuously, intermittently step-by-step operated motor for moving said signal, said motor being actuated by a current moving always in the same direction, said signal being returned to normal position by the action of gravity.

6. In a signaling system, the combination with a track, of a signal, and a continuously, step-by-step operated electric-motor for moving said signal, said motor being actuated by a current moving always in the same direction, said signal being returned to normal position by the action of gravity.

7. In a signaling system, the combination with a track, of a track circuit, a signal, a continuously, step-by-step operated motor for moving said signal, the actuation of said motor being dependent on conditions in the track circuit, and effected by a current moving always in the same direction.

8. In a signaling system, the combination with a track, of a track circuit, a signal, a continuously, step-by-step operated electric-motor for moving said signal, the actuation of said motor being dependent on conditions in the track circuit, and effected by a current moving always in the same direction.

9. In a signaling system, the combination with a track, of a signal, a motor for operating said signal, and means for giving the motor a continuous, step-by-step movement, said means being dependent on a current moving always in the same direction, said signal being returned to normal position by the action of gravity.

10. In a signaling system, the combination with a track, of a track circuit, a signal, a motor for operating said signal, means for giving the motor a continuous, step-by-step movement, said means being dependent on the conditions in the track circuit for its operation, and effected by a current moving always in the same direction.

11. In a signaling system, the combination with a track, of a signal, a signal operating circuit having a continuous current passing therethrough and always in the same direction when closed, a motor for moving the signal from danger position to clear and means for giving an intermittent actuation to said motor by means of said continuous current of the signal operating circuit, said signal being returned to normal position by the action of gravity.

12. In a signaling system, the combination with a track, of a signal, a motor for operating said signal, means for actuating said motor, an electro-magnet independent of said motor, instrumentalities connecting said actuating means with the armature on said electro-magnet, and devices for closing the circuit in which said electro-magnet is included, said circuit carrying a current moving always in the same direction, said signal being returned to normal position by the action of gravity.

13. In a signaling system, the combination with a track, of a track circuit, a signal, a signal operating circuit carrying a current moving always in the same direction, an electro-magnet included within said signal operating circuit, a device independent of said electro-magnet for moving the signal, and connections between said device and the armature of the beforementioned electro-magnet.

14. In a signaling system, the combination with a track, of a track circuit, a signal, a signal operating circuit carrying a current moving always in the same direction, an electro-magnet included within said signal operating circuit, connections between said device and the armature of the beforementioned electro-magnet, and means whereby the closing of the signal operating circuit is dependent upon the conditions of the track circuit.

15. In a signaling system, the combination with a track, of a signal, a signal operating circuit carrying a current moving always in the same direction, an electro-magnet included within said signal operating circuit, a device independent of the electro-magnet for moving said signal, connections between said device and the armature of said electro-magnet, and means for opening and closing the signal operating circuit, said signal being returned to normal position by the action of gravity.

16. In a signaling system, the combination with a track, of a signal, a signal operating circuit carrying a current moving always in the same direction, an electro-magnet included within said signal operating circuit, a device independent of the electro-magnet for moving said signal, connections between said device and the armature of the electro-magnet, and instrumentalities dependent on the movement of said armature for opening and closing said signal operating circuit, said signal being returned to normal position by the action of gravity.

17. In a signaling system, the combination with a track, of a signal, a signal operating circuit carrying a current moving always in the same direction, an electro-magnet included within said signal operating circuit, a device independent of the electro-magnet for moving said signal, connections between said device and the armature of the electro-magnet, and means for moving said armature toward and away from the coil of the electro-magnet, said signal being returned to normal position by the action of gravity.

18. In a signaling system, the combination with a track, of a signal, a signal operating circuit carrying a current moving always in the same direction, an electro-magnet included within said signal operating circuit, a device independent of the electro-magnet for moving said signal, means for giving a back-and-forth movement to the armature of the electro-magnet, and instrumentalities whereby the movement of said armature shall cause a continuous, step-by-step actuation of the said device, said signal being returned to normal position by the action of gravity.

19. In a signaling system, the combination with a track, of a signal, a signal operating circuit carrying a current moving always in the same direction, an electro-magnet included within said circuit, a motor for moving said signal including a shaft, a power wheel on said shaft, and connections between said shaft and the armature of said electro-magnet, said signal being returned to normal position by the action of gravity.

20. In a signaling system, the combination with a track, of a signal, a signal operating circuit, an electro-magnet included in said signal operating circuit, a motor for moving the signal, including a shaft, a power wheel fast thereon, a drum loosely mounted thereon, and connections between the drum and the armature of said electro-magnet.

21. In a signaling system, the combination with a track, of a signal, a signal operating circuit, an electro-magnet included in said signal operating circuit, a motor for moving the signal including a shaft, a power wheel secured to said shaft, a depression in the side of said power wheel, an eccentric on said shaft, a segmental portion surrounding said eccentric and seated in said depression, and connections between said eccentric and the armature of the before mentioned electro-magnet.

22. In a signaling system, the combination with a track, of a signal operating circuit, an electro-magnet included in said signal operating circuit, a motor for moving the signal including a shaft, a power wheel fixed thereon, a depression in the side of said power wheel, a drum loosely mounted on said shaft and carrying an eccentric at the end thereof, a segmental portion surrounding said eccentric, seated in the before-mentioned depression and engaging the rim thereof, and connections between said drum and the armature of the aforesaid electro-magnet.

23. In a signaling system, the combination with a track, of a signal, a signal operating circuit, an electro-magnet included therein, a motor for moving the signal including a shaft, a power wheel fast thereon having a depression in one side thereof, a drum loosely mounted on said shaft and carrying an eccentric at one end thereof, a segmental portion surrounding said eccentric, seated in the before-mentioned depression and engaging the rim thereof, a weighted arm attached to said drum, a second arm extending from said drum and connecting the same with the armature of the before-mentioned electro-magnet.

24. In a signaling system, the combination with a track, of a signal, a signal operating circuit, an electro-magnet included therein, a motor for moving the signal including a shaft, a power wheel secured thereto, a depression in the side of said wheel, a drum loosely mounted on said shaft and engaging said depression, an eccentric operated by said drum, a segmental portion surrounding said eccentric and engaging the rim of said depression, an arm secured to said drum, a rod secured to said arm and connecting the same with the armature of the above-referred to electro-magnet.

25. In a signaling system, the combination with a track, of a signal, a signal operating circuit, an electro-magnet included therein, a motor for moving the signal including a shaft, a power wheel secured thereto, a depression in the side of said wheel, a drum loosely mounted on said shaft and engaging said depression, an eccentric operated by said drum, a segmental portion surrounding said eccentric and engaging the rim of said depression, an arm secured to said drum, a rod secured to said arm and connecting same with the armature of the above-referred to electro-magnet, and a cross-head adjustable on said connecting bar.

26. In a signaling system, the combination with a track, of a signal, a signal operating circuit, an electro-magnet included therein, a motor for moving the signal including a shaft, a power wheel secured thereto, a depression in the side of said wheel, a drum loosely mounted on said shaft and engaging said depression, an eccentric operated by said drum, a segmental portion surrounding said eccentric and engaging the rim of said depression, an arm secured to said drum, a rod secured to said arm and connecting the same with the armature of the above-referred to electro-magnet, and means carried by said bar for making and breaking said signal operating circuit.

27. In a signaling system, the combination with a track, of a signal, a signal operating circuit, an electro-magnet included within said signal operating circuit, a device independent of the electro-magnet for moving said signal, operating instrumentalities connecting said device with the armature of the beforementioned electro-magnet, and means carried by said connecting instrumentalities for making and breaking the above-referred to signal operating circuit.

28. In a signaling system, the combination with a track, of a signal, a signal operating circuit, an electro-magnet included therein, a device independent of said electro-magnet for moving the signal, operating connections between said device and the armature of the above-referred-to electro-magnet, a stationary contact in the signal operating circuit, a movable contact associated therewith, and means carried by the aforesaid operating connections for permitting said movable contact to engage and disengage said stationary contact.

29. In a signaling system, the combination with a track, of a signal, a signal operating circuit, an electro-magnet included therein, a motor for moving the signal including shaft, a power wheel mounted thereon, a drum loosely mounted on said shaft, an arm extending from said drum, a bar connecting said arm with the armature of the before-mentioned electro-magnet, a stationary contact in said signal operating circuit, a movable contact associated therewith and a means carried by the above-referred to communicating bar for alternately causing said movable contact to engage and disengage with said stationary contact.

30. In a signaling system, the combination with a track, of a signal, a signal operating circuit, an electro-magnet included therein, a motor for moving the signal, operating connections between said motor and the armature of the before-mentioned electro-magnet, instrumentalities for making and breaking said signal operating circuit including a rocking member, an arm projecting upwardly therefrom, and constituting the movable contact, a second arm projecting horizontally therefrom, and provided with a finger extending in the same direction beyond said arm, a U shaped leaf having one leg secured to said horizontally projecting arm and the other leg positioned beyond said horizontally projecting arm and engaging over said finger, a stationary contact adapted to be engaged by said upwardly projecting arm of the rocking member, and means carried by the aforesaid connecting means between the armature and motor for engaging under the upper leg of said U shaped leaf and thereby rocking the movable contact.

31. In a signaling system, the combination with a track, of a signal, a signal operating circuit, an electro-magnet included therein, a motor for moving the signal including a shaft, a power wheel fixed thereon and having a depression in the side thereof, a drum loosely mounted on said shaft, and provided with an eccentric at one end thereof, a segmental portion surrounding said eccentric and seated in the above-mentioned depression to engage the rim thereof, a weighted arm attached to said drum, a second arm extending from said drum, a bar connecting said second arm with the armature of the before-mentioned electro-magnet, and means for making and breaking said operating circuit including a stationary contact, a rocking bar having an arm projecting inwardly therefrom and operatively associated with said stationary contact and constituting the movable contact, a second arm projecting horizontally from said rocking bar, a finger extending beyond said arm and in the same direction, a U shaped leaf having one leg thereof secured to said second arm and the other leg positioned beyond said arm and engaging over said finger, and an adjustable cross-head carried by the before-referred to connecting bar, said cross-head carrying a pin adapted to engage under the upper leg of said U shaped leaf and rock the movable contact to break the circuit at the instant that the armature touches the core of the electro-magnet.

32. In a signaling system, the combination with a track, of a signal, a signal operating circuit, an electro-magnet included therein, a motor for moving the signal including a shaft, a power wheel fixed thereon, means for moving said power wheel comprising a drum, connections between said drum and the armature of the before-mentioned electro-magnet whereby to move the same upon attraction of the armature, means for breaking said signal operating circuit and thereby releasing the armature, and a weighted arm secured to said drum for throwing the same when said armature has been released.

33. In a signaling system, the combination with a track, of a signal, a signal operating circuit, an electro-magnet included therein, a motor for moving the signal including a shaft, a power wheel fixed thereon and having a depression in the side thereof, a drum loosely mounted on said shaft, an eccentric surrounding the end of said drum, a segmental portion loosely engaging said eccentric and seated in said depression of the power wheel, connections between said drum and the armature of said electro-magnet, means for breaking said signal operating circuit and releasing said armature thereby, and a weighted arm secured to said drum for moving the same upon such release of the armature.

34. In a signaling system, the combination with a track, of a signal, a signal circuit, a switch, a signal for said switch, a switch-signal-circuit connected between the first mentioned signal circuit and ground, said switch signal being controlled by the position of the aforesaid switch.

35. In a signaling system, the combination with a track, of a signal, a signal circuit, a switch, a signal for said switch, a switch-signal-circuit connected between the first mentioned signal circuit and ground, and means for controlling the switch signal including a bar connecting the movable member of said switch with a rotatable post, a head slidable upon said post, and a contact member carried by said slidable head.

36. In a signaling system, the combination with a track, of a signal, a signal circuit, a switch, a signal for said switch, a switch-signal-circuit connected between the first mentioned signal circuit and ground, and means for controlling the switch signal including a bar connecting the movable member of said switch with a rotatable post, means for locking said post in several positions, and a contact movable in accordance with such positions.

37. In a signaling system, the combination with a track, of a signal, a signal circuit, a switch, a signal for said switch, a switch-signal-circuit connected between the first mentioned signal circuit and ground, means for operating the switch, and a contact carried by said switch operating means for closing said switch-signal-circuit.

38. In a signaling system, the combination with a track, of a signal, a signal circuit, a switch, a signal for said switch, a switch-signal-circuit connected between the first mentioned signal circuit and ground, and means for controlling the switch signal including a bar connecting the movable member of said switch with a rotatable post, a head slidable upon said post, and a contact carried by said head and adapted to close said switch-signal-circuit.

39. In a signaling system, the combination with a track, of a signal, a signal circuit, a switch, a signal for said switch, a switch-signal-circuit connected between the first mentioned signal circuit and ground, means for operating the switch including a body portion, a post extending vertically therethrough and rotatable therein, a disk-like member secured to the bottom of said post, a bar connecting said disk-like member and the movable part of said switch, an angular portion on the upper end of said post, a head slidable upon said angular portion and engaging a similarly shaped recess in the upper part of the body portion, a lever connected with the slidable head, a horn-shaped member carried by said head and provided with a contact adapted to close the aforementioned switch-signal circuit.

40. In a signaling system, the combination with a track, of a track circuit therefor, of a signal, a signal operating circuit, an electro-magnet in said track circuit, an armature therefor controlling pairs of contacts and instrumentalities whereby the operation of the armature of said electro-magnet, dependable upon the conditions of the track circuit, shall affect said signal operating circuit.

41. In a signaling system, the combination with a track, of a track circuit, an electro-magnet included therein, an armature therefor controlling pairs of contacts a signal, a signal operating circuit, and instrumentalities operated by the armature of said electro-magnet for directing the current in said signal operating circuit.

42. In a signaling system, the combination with a track, of a track circuit, of a signal, a signal operating circuit, and an instrument including pairs of contacts under the control of said track circuit for effecting proper movement of the current in the signal operating circuit.

43. In a signaling system, the combination with a track, of a track circuit, an electro-magnet within said circuit, a movable bar having its movement controlled by the armature of said electro-magnet, a plurality of pairs of spring-contact-members adapted to be alternately brought into engagement and separated by said bar, and circuits in which said pairs of spring-contact-members are included.

44. In a signaling system, the combination with a track, of sub-blocks therein, and sub-block circuits within said sub-blocks, electro-magnets included in said sub-block circuits, signals for said sub-blocks, a signal operating circuit therefor, movable bars controlled by the position of the armature of said electro-magnets, pairs of spring-contact-members under control of said movable bars, circuits including said spring-contact-members whereby to direct the movement of the current in said signal operating circuit, and means for preventing simultaneous operation of the spring-contact-members upon movement of both of the controlling bars.

45. In a signaling system, the combination with a track, of a sub-block therein, a sub-block circuit within said sub-block, an electro-magnet included in said sub-block circuit, a movable bar controlled by the position of the armature of said electro-magnet, studs carried by said bar, a plurality of stationary spring-contact-members, movable-contact-members adapted to be engaged by said studs, and circuits arranged to be closed upon the operation of said movable contact-members.

46. In a signaling system, the combination with a track, of a sub-block therein, a sub-block circuit within said sub-block, an electro-magnet included in said sub-block circuit, a movable bar, a seat on said bar adapted to be engaged by the armature of said electro-magnet, a link pivoted at one end to the lower extremity of said bar and at the other end to a stationary part of the frame, a slotted portion at the other end of said bar, studs upon the bar, a pivoted arm, a stud carried by the shoulder portion thereof, a pin upon the fore-arm of said arm and engaging said slotted portion of the before-mentioned bar, a plurality of stationary-contact-members, and a plurality of movable spring-contact-members adapted to be engaged by the studs upon said movable bar and the shoulder portion of said pivoted arm, and circuits in which said contact-members are included.

47. In a signaling system, the combination with a track, of signals along-side said track, and a tell-tale-signal-and-station-signal-controlling means arranged between two signals, and both manual and automatic instrumentalities for controlling the operation of said signals.

48. In a signaling system, the combination with a track, of signals along-side said track, a signal operating circuit, and a tell-tale-signal-and-station-signal-controlling-means positioned intermediate two signals and adapted to automatically indicate the position of such signals.

49. In a signaling system, the combination with a track, of signals along-side said track, a tell-tale-signal-and-station-signal-controlling-means positioned intermediate two signals, and including an electro-magnet for each signal, a tell-tale-signal under the control of each electro-magnet and an audible alarm operable in connection therewith.

50. In a signaling system, the combination with a track, of signals along-side said track, a tell-tale-signal-and-station-signal-controlling-means for setting the signals at "safety" position or "danger" position regardless of the conditions ordinarily controlling the signal operating circuit.

51. In a signaling system, the combination with a track, of signals along-side said track, a tell-tale-signal-and-station-signal-controlling-means positioned intermediate two signals and including a pair of rotatable posts capable of movement to positions such that the signal for such post will operate automatically, or will at once be set to "danger" position, or that a bell associated with said tell-tale-signal-and-station-signal-controlling-means will ring upon danger conditions in the corresponding portion of the track, and means for preventing the simultaneous movement of the posts to the position resulting in automatic operation of the signals.

52. In a signaling system, the combination with a track, signals along-side said track, a tell-tale-signal-and-station-signal-controlling-means positioned intermediate two signals and means for grounding the signal operating current between each signal and the tell-tale-signal-and-station-signal-controlling-means.

53. In a signaling system, the combination with a track, signals along-side said track, a tell-tale-signal-and-station-signal-controlling-means positioned intermediate two signals and including a rotatable post, a segmental contact member secured to said post, a stationary contact constantly in engagement with said segmental contact member and a second stationary contact adapted to be disengaged from said segmental contact member when the same is moved to one of its positions.

54. In a signaling system, the combination with a track, signals along-side said track, a tell-tale-signal-and-station-signal-controlling-means positioned intermediate two signals and including a rotatable post, a segmental contact upon said post, a disk-contact-member upon said post, and spaced from said segmental contact-member, and stationary contacts for engaging the before-mentioned segmental contact member and disk-contact-member.

55. In a signaling system, the combination with a track, of signals along-side said track, a tell-tale-signal-and-station-signal-controlling-means positioned intermediate two signals and including a post, a disk-like contact member secured to said post, said disk contact member being provided with three contact sections, and stationary contact members engaging each of said contact sections.

56. In a signaling system, the combination with a track, of signals along-side said track, a tell-tale-signal-and-station-signal-controlling-means positioned intermediate said signals, and including a rotatable post, a disk-like contact member secured thereto and divided into several contact sections, and a stationary forked-shaped spring-contact-member engaging said disk and having one of the arms of said fork constantly in engagement with one section of said disk contact member, and the other arm of said fork-shaped spring-contact-member adapted to alternately engage one of two sections of said disk contact member.

57. In a signaling system, the combination with a track, of signals along-side said track, a tell-tale-signal-and-station-signal-controlling-means positioned intermediate said signals, and including a rotatable post, a segmental contact member secured to said post, a pair of stationary spring-contact-members, one constantly in engagement with said segmental contact member, and the other disengaged therefrom in the position of the post, a disk contact member secured to said post and spaced from said segmental contact member, said disk contact member being divided into a plurality of contact sections, and stationary contact members in engagement with each of said sections.

58. In a signaling system, the combination with a track, of signals along-side said track, tell-tale-signal-and-station-signal-controlling means positioned intermediate two signals and including a rotatable post, a segmental contact member on said post, a pair of spring-contacts, one constantly in engagement with said segmental portion and the other disengaged therefrom in one position of the post, a disk contact member on said post and spaced from said segmental contact member, said disk contact member being divided into a plurality of contact sections, and a pair of fork-shaped spring-contact members engaging said sections, the shorter arms of said fork-shaped contact members being constantly in engagement with one of said sections of the disk contact member, and the other of the arms of said fork-shaped contact members being adapted to engage either of two of the sections of said disk-shaped contact member upon rotation of the same.

59. The combination with a track divided into blocks and sub-blocks, of independent circuits for each sub-block, of a signal operating circuit including an element of each independent circuit, a current-directing instrument included within said signal operating circuit, and means controlled by each sub-block circuit for governing said instrument.

60. The combination with a track divided into blocks and sub-blocks, of a signal operating circuit including an element of each independent circuit, a current-directing instrument included within said signal operating circuit and comprising a plurality of contacts, and means controlled by each sub-block circuit for opening certain of said contacts and closing other of said contacts.

61. The combination with a track divided into blocks and sub-blocks, of a signal operating circuit including an element of each independent circuit, a current-directing instrument included within said signal-operating circuit and comprising a plurality of primary and secondary contacts arranged to be alternately opened and closed upon varying conditions of the sub-block circuits.

62. In a signaling system, the combination with a track, of a signal placed alongside said track, a motor for moving said signal including a shaft and a wheel fixed thereon, said signal being returned to normal position by the action of gravity, a circuit adapted to close and operate a signal upon a train or other moving body upon the track, a stationary contact in said circuit, and a movable contact for engagement therewith and controlled by the aforesaid wheel.

63. In a signaling system, the combination with a track, of a signal movable to two indicating positions, a signal operating circuit, an intermittently actuated motor for moving said signal from one position to the other, and means for giving such intermittent actuation to said motor by means of a current moving always in the same direction in the signal operating circuit said signal being returned to normal position by the action of gravity.

64. In a signaling system, the combination with a track, of a signal, a signal operating circuit, an electro-magnet included therein, a motor for moving the signal including a wheel, operating connections between said motor and the armature of the above referred to electro-magnet, a stationary contact in the signal operating circuit, a movable contact associated therewith, and means carried by the aforesaid operating connections for permitting said movable contact to engage and disengage said stationary contact.

65. In a signaling device, the combination with a track, of a signal, a signal operating circuit having a continuous current passing therethrough when closed, a motor including a wheel, for moving said signal, and means for giving an intermittent actuation to said motor by means of the continuous current in the signaling operating circuit, said signal being returned to normal position by the action of gravity.

66. In a signaling system, the combination with a track, of a track circuit, a signal, a signal operating circuit carrying a current moving always in the same direction, an electro-magnet included within said signal operating circuit, and a motor removed from said electro-magnet and connected to the armature thereof.

67. In a signaling system, the combination with a track, of a track circuit, a signal, a signal operating circuit carrying a current moving always in the same direction, an electro-magnet included in said signal operating circuit, a motor, including a wheel, for moving the signal, and connections between said motor and the armature of the before-mentioned electro-magnet.

68. In a signaling system, the combination with a track, of a track circuit, a signal, a signal operating circuit, an electro-magnet included in said signal operating circuit, a motor, including a wheel, for moving the signal, connections between the motor and the armature of the aforesaid electro-magnet, and means for opening and closing said signal operating circuit.

69. In a signaling system, the combination with a track, of a track circuit, a signal, a signal operating circuit, an electro-magnet, included in said signal operating circuit, a device, including a wheel, for moving the signal, connections between the device and the armature of the aforesaid electro-magnet, and instrumentalities dependent on the movement of said armature for opening and closing said signal operating circuit.

70. In a signaling system, the combination with a track, of a signal, and a continuously, intermittently step-by-step operated motor for moving the signal in one direction said signal being returned to normal position by the action of gravity.

71. In a signaling system, the combination with a track, of a signal, and a continuously, step-by-step operated electric motor for moving the signal in one direction said signal being returned to normal position by the action of gravity.

In testimony whereof, I affix my signature, in the presence of two subscribing witnesses.

JOSEPH LEMIRE.

Witnesses:
F. TETREAU,
JAS. P. DENT.